United States Patent Office 2,830,955
Patented Apr. 15, 1958

2,830,955
POLYAMIDE-THICKENED GREASE

Joseph A. Dixon, Bellwood, Pa., assignor to California Research Corporation, San Francisco, Calif., a corporation of Delaware No Drawing. Application November 23, 1955
Serial No. 548,750

6 Claims. (Cl. 252—51.5)

This patent application is directed to new grease thickening agents for the formation of high temperature grease compositions. Specifically, this patent application is directed to high temperature grease compositions prepared with certain particular polyamides.

This application is a continuation-in-part of patent application Serial No. 305,290, filed August 19, 1952 (and now abandoned).

It is becoming more and more apparent that, for the most part, greases must be able to lubricate effectively at high temperatures; that is, temperatures in the range of 350° F. to 500° F., preferably above 400° F. Numerous grease specifications of government agencies and industries now specify grease compositions having minimum dropping points of 400° F. This need for high temperature greases is the result of increased driving power, which increases the speeds of gears, bearings, and other moving parts; increased pressures caused by the development of smaller gears to withstand greater loads than heretofore possible with larger gears, etc.

Greases prepared according to the present invention will maintain grease consistencies at extremely high temperatures; that is, such greases will remain unctuous and not become hard or brittle at temperatures in the range of 350° F. to 500° F.

In the automotive industry, for example, there is the constant desire to manufacture smaller internal combustion engines without sacrificing power output. In fact, many of these smaller engines are designed to deliver greater power than their larger counterparts. The same smaller engines have considerably less bearing surfaces than the larger predecessors, which means that the bearings bear greater loads than before.

Similarly, the continuing trend to manufacture automobiles with lower centers of gravity has made it necessary to use smaller driving gears, particularly in such gear assemblies as the differentials and transmissions. The smaller gears thus used have considerably greater pressures exerted upon them per unit area than gears of older type gear assemblies. The higher loads on bearings and gears demand better thickening agents in grease compositions.

According to the present invention, lubricating oils are thickened to the consistency of greases by incorporating certain polyamides therein. These polyamides are prepared by first reacting a dicarboxylic acid with a diamine, wherein the molar ratio of dicarboxylic acid to amine has a value from 1.6 to about 4. The dicarboxylic acid-diamine reaction product is then further treated with a sufficient amount of a primary or secondary amine (or mixtures thereof) to completely react with the residual carboxyl groups, forming the thickening agent of this invention. For sake of brevity, this thickening agent will be termed "Polyamide," which polyamide is represented by Formula A hereinbelow.

The reactions involved in the preparation of this thickening agent are exemplified as follows:

Equation 1

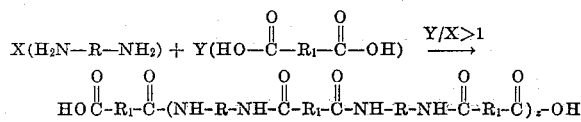

Equation 2

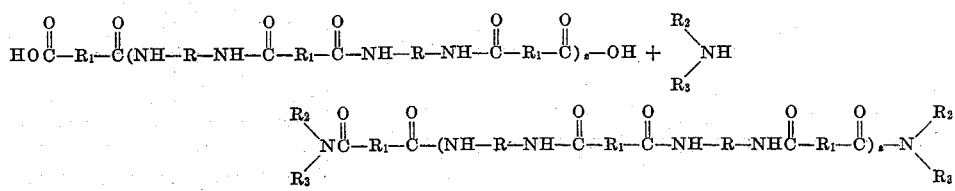

Formula A wherein R, $R_1$ and $R_2$ are aliphatic radicals, $R_3$ is hydrogen or an aliphatic radical, and Y/X is the molar ratio of dibasic acid to diamine, which ratio has a value from 1.6 to about 4 (2 to 3 being preferred).

The values of "z" in the above equations are not fixed values for any one reaction. To those skilled in the art, it is understandable that, although "z" is an integer, a certain degree of variation is experienced within any one particular reaction. In the formation of thickening agents of this invention, the "average" value for "z" may vary only from about 1.5 to 4.

The R and $R_1$ groups are polymethylene groups (i. e., $(CH_{2x})$, wherein $x$ is a number from the R groups from 2 to 10 (4 to 6 being preferred).

$R_2$ and $R_3$ (where $R_3$ is not hydrogen) are aliphatic radicals containing from 2 to 22 carbon atoms (4 to 16 carbon atoms being preferred).

It is preferred that R is a hexamethylene radical; that $R_1$ is a tetramethylene radical; that $R_2$ is an aliphatic radical containing from 4 to 16 carbon atoms; and that $R_3$ is hydrogen.

Examples of R and $R_1$ groups include dimethylene, trimethylene, hexamethylene, octamethylene, octadecylmethylene; radicals derived from petroleum hydrocarbons, such as white oil, olefin polymers, etc.

Examples of the $R_2$ and $R_3$ radicals (when $R_3$ is not hydrogen) include the following: ethyl, propyl, propenyl, butyl, hexyl, octyl, octenyl, nonyl, decyl, dodecyl, tetradecyl, hexadecyl, octadecyl, eicosyl; radicals derived from petroleum hydrocarbons such as white oil, wax, olefin polymers, etc.

When the ratio of Y/X in Equation 1 hereinabove has a value of 1, the resulting polymer is of the nylon type polymeric compounds. As set forth in "Fibers for Synthetic Polymers," by Rowland Hill (published by Elsevier Publishing Company), 1953, page 118: "The word 'nylon' is not a trade name, but a word coined as a generic term for a synthetic fiber-forming polyamide." Further, on page 220 of the same text, it is stated that the molecular weights of synthetic fiber-forming polyamides usually exceed 10,000.

As opposed to the nylon type polymeric compounds, the molecular weights of the dibasic acid-diamine polymeric compounds used herein as grease thickening agents are less than 1000.

Lubricating oils which are suitable base oils for the grease composition of this invention include a wide variety of lubricating oils, such as naphthenic base, paraffin base, and mixed base, other hydrocarbon lubricants, e. g., lubricating oils derived from coal products, and synthetic oils, e. g., alkylene polymers (such as polymers of propylene, butylene, etc., and mixtures thereof), alkylene oxide type polymers, dicarboxylic acid esters, liquid esters of acids of phosphorus, alkyl benzene polymers, polymers of silicon, etc. Synthetic oils of the alkylene oxide type polymers which may be used include those exemplified by the alkylene oxide polymers (e. g., propylene oxide polymers) and derivatives, including alkylene oxide polymers prepared by polymerizing the alkylene oxides, e. g., propylene oxide, in the presence of water or alcohols, e. g., ethyl alcohol; esters of ethylene oxide type polymers, e. g., acetylated propylene oxide polymers prepared by acetylating propylene oxide polymers containing hydroxyl groups; polyethers prepared from the alkylene glycols, e. g., ethylene glycol, etc.

The polymeric products prepared from the various alkylene oxides and alkylene glycols may be polyoxyalkylene diols or polyalkylene glycol derivatives; that is, the terminal hydroxy group can remain as such, or one or both of the terminal hydroxy groups can be removed during the polymerization reaction by esterification or etherification.

Synthetic oils of the dicarboxylic acid ester type include those which are prepared by esterifying such dicarboxylic acids as adipic acid, azaleic acid, suberic acid, sebacic acid, alkenyl succinic acid, fumaric acid, maleic acid, etc., with alcohols such as butyl alcohol, hexyl alcohol, 2-ethylhexyl alcohol, dodecyl alcohol, etc. Examples of dicarboxylic acid ester synethetic oils include dibutyl adipate, dihexyl adipate, and di-2-ethylhexyl sebacate.

Synthetic oils of the alkylbenzene type include those which are prepared by alkylating benzene (e. g., dodecyl benzene, tetradecyl benzene, etc.).

Synthetic oils of the type of liquid esters of acids of phosphorus include the esters of phosphoric acid, e. g., tricresyl phosphate; the esters of phosphonic acid, e. g., the diethyl ester of decanephosphonic acid, etc.

Synthetic oils of the type of polymers of silicon include the liquid esters of silicon and the polysiloxanes. The liquid esters of silicon and the polysiloxanes include those exemplified by tetraethyl silicate, tetraisopropyl silicate, tetra(methyl-2-butyl) silicate, tetra(4-methyl-2-penta) silicate, tetra(1-methoxy-2-propyl) silicate, hexyl(4-methyl-2-pentoxy) disiloxane, poly(methylsiloxane), poly-(methylphenylsiloxane), etc.

The above base oils may be used individually as such or in various combinations, wherever miscible or wherever made so by the use of mutual solvents.

The grease-thickening agents of this invention can be used in amounts sufficient to thicken the oils to the consistency of a grease; that is, in amounts of 6% to 50%, by weight; however, 10% to 30% by weight are preferred.

As se forth in Examples 1 and 2 hereinbelow, the nylon type polyamides do not thicken lubricating oils to consistency of greases.

*Example 1.—Attempted preparation of grease compositions from nylon 66*

A mixture of 25 grams of nylon 66 (i. e., a nylon prepared by hexamethylene diamine and adipic acid) and 75 grams of a California naphthenic base oil having a viscosity of 450 SSU at 100° F. was heated to a temperature of 475° F. with violent agitation. The nylon melted in the temperature range of 400–450° F. However, the nylon was not miscible with the oil, even at the top temperature. When the mixture was cooled to room temperature, the nylon separated out as a solid cake.

*Example 2.—Attempted preparation of grease compositions from nylon 610*

A mixture of 25 grams of nylon 610 (that is, a nylon prepared from hexamethylene diamine and sebacic acid) and 75 grams of a California naphthenic base oil having a viscosity of 450 SSU at 100° F. was heated to a temperature of 475° F. The nylon melted in the temperature range of 400–450° F. However, the nylon was not miscible with the oil, even at the top temperature. When the mixture was cooled to room temperature, the nylon separated out as a solid cake.

The following examples illustrate the preparation of the polyamides of this invention and the grease compositions prepared therefrom:

*Example 3*

A mixture of 77.5 grams (0.5 mol) hexamethylene diamine (75% solution in water) and 146 grams (1 mol) of adipic acid was slowly heated with stirring. Water of reaction began to come from the reaction mixture at 240° F. 20 minutes later, the temperature had reached 390° F., at which temperature the water of reaction ceased. To this reaction mixture 244 grams (0.9 mol) of Armeen HTD (defined hereinbelow) was added dropwise at temperatures ranging from 390–430° F. over a period of 30 minutes. The reaction mixture was heated for an additional 5 minutes at 430° F. The cooled reaction product was a tan solid.

30 grams of the above reaction mixture (i. e., the tan solid) and 170 grams of a California solvent-refined naphthenic base oil having a viscosity of 450 SSU at 100° F. were heated, with stirring, to 470° F. This mixture was cooled to room temperature and milled through a 200-mesh screen. The resulting grease had a dropping point of 467° F. and an ASTM worker penetration of 230 (60 strokes).

*Example 4*

A mixture of 77.5 grams (0.5 mol) of a 75% aqueous solution of hexamethylene diamine and 219 grams (1.5 mols) of adipic acid was heated, with stirring, to 420° F. The reaction mixture was kept at this temperature until the water of reaction had ceased. To this reaction mixture was added 622 grams (2 mols) of Armeen HT (defined hereinbelow). The temperature was maintained at 440–450° F. until all of the water of reaction had ceased. On cooling, the reaction product was a hard, brittle, cream-colored solid.

A mixture of 30 grams of the above reaction product and 170 grams of a California solvent-refined base oil having a viscosity of 450 SSU at 100° F. was heated, with stirring, to 470° F. The reaction mixture was cooled to room temperature, then milled through a 200-mesh screen. The resulting grease had a dropping point of 452° F. and an ASTM penetration of 250 (60 strokes).

*Example 5*

A mixture of 101 grams (0.5 mol) of sebacic acid and 27 grams (0.25 mol) of 2,6-diaminopyridine was heated, with stirring, to a final temperature of 440° F. until the water of reaction ceased. To this reaction mixture 135 grams (0.5 mol) of Armeen HTD was added dropwise over a period of 10 minutes. The whole reaction mixture was heated to a temperature of 440° F. until the water of reaction had ceased. The cooled reaction product was a brittle, greenish-brown solid.

A mixture of 30 grams of the above reaction product and 170 grams of a California solvent-refined naphthenic base oil having a viscosity of 450 SSU at 100° F. was heated to 520° F. The mixture was cooled to room temperature and milled through a 200-mesh screen.

Table I hereinbelow presents further data on grease preparations of this invention. Except for greases of Experiment Nos. 13 and 14, which contain 10%, all of the grease preparations of Table I contain 12% of the thickening agent.

The abbreviations of Table I are defined as follows:

"HTD" is "Armeen HTD," a product of Armour & Company, Chicago, Illinois, containing 25% n-hexadecylamine, 70% n-octadecylamine, and 5% n-octadecenylamine. "HT" is "Armeen HT," a composition containing 25% n-hexadecylamine, 70% n-octadecylamine and 5% n-octadecenylamine; 85% of the whole of such amines consisting of n-primary amines.

"CD" is "Armeen CD," an amine mixture consisting of 8% n-octylamine, 9% n-decylamine, 47% n-dodecylamine, 18% n-tetradecylamine, 8% n-hexadecylamine, 5% n-octadecylamine and 5% n-octadecenylamine.

$R_3$ in each thickener was hydrogen.

Base oil A was a California solvent-refined naphthenic base oil having a viscosity of 450 SSU at 100° F.

Base oil B was a California heavy white oil.

TABLE I

| Exp. No. | Thickener composition | | | | Grease properties | | |
|---|---|---|---|---|---|---|---|
| | R group | $R_1$ group | $R_2$ group | Mol acid/ mol diamine | Dropping point (° F.) | ASTM penetration, worked (60 strokes) | Base oil |
| 1 | $(CH_2)_6$ | $(CH_2)_4$ | HTD | 2 | 467 | 230 | A |
| 2 | $(CH_2)_2$ | $(CH_2)_4$ | HTD | 2 | 500+ | 226 | A |
| 3 | $CH_3$<br>\|<br>$H_2C—CH_2$ | $(CH_2)_4$ | HTD | 2 | 416 | 305 | A |
| 4 | $(CH_2)_6$ | $(CH_2)_4$ | HT | 2 | 436 | 265 | A |
| 5 | $(CH_2)_6$ | $(CH_2)_4$ | HTD | 1.8 | 457 | 229 | A |
| 6 | $(CH_2)_6$ | $(CH_2)_4$ | HTD | 2.6 | 446 | 222 | A |
| 7 | $(CH_2)_6$ | $(CH_2)_4$ | HT | 3 | 452 | 250 | A |
| 8 | $(CH_2)_6$ | $(CH_2)_4$ | CD | 2 | 365 | --- | A |
| 9 | $(CH_2)_6$ | $(CH_2)_4$ | HT | 4 | 375 | --- | A |
| 10 | $(CH_2)_6$ | $(CH_2)_4$ | ½ HTD + ½ CD | 2 | 436 | 271 | A |
| 11 | ½ $(CH_2)_6$ + ½ p-phenylene | $(CH_2)_4$ | HT | 2 | 410 | 361 | A |
| 12 | $(CH_2)_6$ | $(CH_2)_4$ | HT | 1.8 | 454 | 284 | B |
| 13 | $CH_3$<br>\|<br>$H_2C—CH_2$— and $(CH_2)_2$ | $(CH_2)_4$ | HT | 2 | 428 | 824 | A |
| 14 | $(CH_2)_6$ | $(CH_2)_4$ | HTD | 2.2 | 440 | 258 | A |
| 15 | $(CH_2)_6$ | $(CH_2)_4$ | HTD | 2.4 | 450 | 289 | B |

The data presented hereinbelow in Table II show (1) the effectiveness of the thickening agents of this invention in resisting oxidation, (2) the extreme pressure characteristics, and (3) resistance to wear. The Norma Hoffman ASTM D-942 oxidation stability test measures the loss in oxygen pressure over a period of 100 hours and 500 hours. The Almen test, which measures the loss in wear (steel over bronze) at a pressure of 8 p. s. i. during a period of 5 minutes, is described in "Lubricants and Lubrication," by Clower, published by McGraw-Hill Book Company in 1939, pages 145 to 148. The Falex test, which measures wear loss at several pressures (steel on steel), is described in "Journal of the Institute of Petroleum," vol. 32, April 1946.

Greases Nos. 13 and 14 are, respectively, those of Experiment Nos. 13 and 14 of above Table I.

TABLE II

| Grease No. | Falex wear test (mg. loss) | | Almen test (mg. loss) | Norma Hoffman test (pressure drop, p.s.i.) | |
|---|---|---|---|---|---|
| | 125 lbs. | 500 lbs. | | 100 hrs. | 500 hrs. |
| 13 | 2.6 | 1.2 | 3.4 | 5 | 17 |
| 14 | --- | --- | --- | 8 | --- |

The thickening agents herein remarkably resist oxidation and rusting action. Greases prepared therefrom are highly resistant to oxidation and rusting.

In addition to the grease thickening agents of this invention, the grease composition may include other agents which will further enhance resistance to oxidation, other extreme pressure characteristics, resistance to wear; agents which serve as color correctors, rust inhibitors, thickening agents, etc.

I claim:

1. A grease composition comprising a major proportion of a lubricating oil and, in an amount sufficient to thicken said lubricating oil to the consistency of a grease, a grease thickening agent obtained by first forming a polyamide having terminal carboxylic acid groups by reacting aliphatic dibasic acids containing from 4 to 12 carbon atoms and aliphatic diamines containing from 2 to 22 carbon atoms, wherein the mol ratio of said dibasic acids to said diamines has a value from 1.5 to 4, followed by reacting the resulting polyamide with n-primary amines containing from 2 to 22 carbon atoms in an amount sufficient to form an amide with the residual acid groups of said polyamide, the resulting grease thickening agent having a molecular weight less than 1000.

2. A grease composition comprising a major proportion of a lubricating oil and, in an amount sufficient to thicken said lubricating oil to the consistency of a grease, a grease thickening agent obtained by first forming a polyamide having terminal carboxyl groups by reacting aliphatic dibasic acids containing from 6 to 8 carbon atoms and aliphatic diamines containing from 4 to 6 carbon atoms, wherein the mol ratio of said dibasic acids to said diamines has a value from 1.5 to 4, followed by reacting the resulting polyamide with n-primary aliphatic amines containing from 4 to 16 carbon atoms in an amount sufficient to form an amide with the residual acid groups of said polyamide, the resulting grease thickening agent having a molecular weight less than 1000.

3. A grease composition comprising a major proportion of a lubricating oil and, in an amount sufficient to thicken said lubricating oil to the consistency of a grease, a grease thickening agent obtained by forming a polyamide having terminal carboxyl groups by reacting adipic acid and hexamethylene diamine, wherein the mol ratio of adipic acid to said diamine has a value from 1.5 to 4, followed by reacting the resulting adipic acid-hexamethylene diamine polyamide with n-primary octadecylamine in an amount sufficient to form an amide with the residual carboxylic groups of said polyamide, the resulting grease thickening agent having a molecular weight less than 1000.

4. A grease composition comprising a major proportion of a lubricating oil and, in an amount sufficient to thicken said lubricating oil to the consistency of a grease, a grease thickening agent obtained by forming a polyamide having terminal carboxylic groups by reacting adipic acid and hexamethylene diamine, wherein the mol ratio of adipic acid to said diamine has a value from 2 to 3, followed by reacting the resulting adipic acid-hexamethylene diamine polyamide with n-primary octadecylamine in an amount sufficient to form an amide with the residual carboxylic groups of said polyamide, the resulting grease thickening agent having a molecular weight less than 1000.

5. A grease composition comprising a major proportion of a lubricating oil and from 6% to 50% by weight of a grease thickening agent obtained by forming a polyamide having terminal carboxylic groups by reacting adipic acid and hexamethylene diamine, wherein the mol ratio of adipic acid to said diamine has a value of 1.5 to 4, followed by reacting the resulting adipic acid-hexamethylene diamine polyamide with n-primary octadecylamine in an amount sufficient to form an amide with the residual carboxyl groups of said polyamide, the resulting grease thickening agent having a molecular weight less than 1000.

6. A grease composition comprising a major proportion of a lubricating oil and from 10% to 30% by weight of a grease thickening agent obtained by forming a polyamide having terminal carboxylic groups by reacting adipic acid and hexamethylene diamine, wherein the mol ratio of adipic acid to said diamine has a value of 1.5 to 4, followed by reacting the resulting adipic acid-hexamethylene diamine polyamide with n-primary octadecylamine in an amount sufficient to form an amide with the residual carboxylic groups of said polyamide, the resulting grease thickening agent having a molecular weight less than 1000.

References Cited in the file of this patent

UNITED STATES PATENTS

| | | |
|---|---|---|
| 2,594,286 | Bryant et al. | Apr. 29, 1952 |
| 2,604,449 | Bryant et al. | July 22, 1952 |